United States Patent
Adams et al.

(10) Patent No.: US 10,176,528 B2
(45) Date of Patent: *Jan. 8, 2019

(54) PREDICTIVE MODEL-BASED DISCRIMINATOR

(71) Applicant: HARTFORD FIRE INSURANCE COMPANY, Hartford, CT (US)

(72) Inventors: Jonathan Kaleb Adams, Middletown, CT (US); John Albert McGoldrick, Meriden, CT (US); James Dominic Ruotolo, Meriden, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/192,470

(22) Filed: Jun. 24, 2016

(65) Prior Publication Data
US 2016/0307200 A1    Oct. 20, 2016

Related U.S. Application Data

(63) Continuation of application No. 12/099,388, filed on Apr. 8, 2008, now Pat. No. 9,378,527.

(51) Int. Cl.
*G06Q 40/00* (2012.01)
*G06Q 40/08* (2012.01)
(Continued)

(52) U.S. Cl.
CPC .............. *G06Q 40/08* (2013.01); *G06N 5/04* (2013.01); *G06N 99/005* (2013.01); *G06Q 10/04* (2013.01);
(Continued)

(58) Field of Classification Search
CPC .................................................... G06Q 40/08
See application file for complete search history.

(56) References Cited

U.S. PATENT DOCUMENTS

| 5,557,515 A | 9/1996 | Abbruzzese et al. |
| 5,579,407 A | 11/1996 | Murez |

(Continued)

FOREIGN PATENT DOCUMENTS

WO    0113295 A1    2/2001

OTHER PUBLICATIONS

Eckerson, Wayne W., "Predictive Analytics: Extending the Value of Your Data Warehousing Investment", TDWI Best Practices Report, First Quarter 2007, 35 pgs.

(Continued)

*Primary Examiner* — Eric T Wong
(74) *Attorney, Agent, or Firm* — Howard IP Law Group

(57) ABSTRACT

A computer system includes a data storage module which receives, stores, and provides access to determinate data, raw indeterminate data, and extracted indeterminate data captured by an indeterminate data capture module. The computer system also includes a computer processor, a model training component, and a screening module. The model training component generates the predictive model based upon historical determinate and indeterminate data, and continuously adapts the predictive model with new historical data. The screening module categorizes current claims according to whether they are suitable for predictive analysis by the predictive model. The predictive model is applied to the current claims suitable for predictive analysis to determine a value for each claim indicative of whether the current claim transaction is questionable. The system also includes an output device which outputs the determined value for each claim, and a routing modules which routes claim workflow based on the outputted values.

12 Claims, 6 Drawing Sheets

(51) Int. Cl.
*G06Q 10/04* (2012.01)
*G06Q 30/02* (2012.01)
*G06N 5/04* (2006.01)
*G06N 99/00* (2010.01)
*G06Q 20/40* (2012.01)

(52) U.S. Cl.
CPC ..... *G06Q 20/4016* (2013.01); *G06Q 30/0202* (2013.01)

(56) References Cited

U.S. PATENT DOCUMENTS

| | | | |
|---|---|---|---|
| 5,819,226 | A | 10/1998 | Gopinathan et al. |
| 5,822,741 | A | 10/1998 | Fischthal |
| 6,253,186 | B1 | 6/2001 | Pendleton, Jr. |
| 6,523,019 | B1 | 2/2003 | Borthwick |
| 6,597,775 | B2 | 7/2003 | Lawyer et al. |
| 6,714,918 | B2 | 3/2004 | Hillmer et al. |
| 6,826,536 | B1 | 11/2004 | Forman |
| 7,050,932 | B2 | 5/2006 | Selby et al. |
| 7,089,592 | B2 | 8/2006 | Adjaoute |
| 7,263,492 | B1 | 8/2007 | Suresh et al. |
| 7,266,537 | B2 | 9/2007 | Jacobsen et al. |
| 7,813,944 | B1 | 10/2010 | Luk et al. |
| 2002/0194002 | A1 | 12/2002 | Petrushin |
| 2003/0033145 | A1 | 2/2003 | Petrushin |
| 2003/0158751 | A1 | 8/2003 | Suresh et al. |
| 2004/0093218 | A1 | 5/2004 | Bezar |
| 2005/0043961 | A1 | 2/2005 | Torres et al. |
| 2005/0091524 | A1* | 4/2005 | Abe .................. G06F 21/6245 726/26 |
| 2005/0276401 | A1 | 12/2005 | Madill, Jr. et al. |
| 2006/0041464 | A1 | 2/2006 | Powers et al. |
| 2006/0149674 | A1 | 7/2006 | Cook et al. |
| 2007/0219820 | A1 | 9/2007 | Busch |
| 2008/0077451 | A1 | 3/2008 | Anthony et al. |
| 2012/0173289 | A1* | 7/2012 | Pollard .................. G06Q 40/08 705/4 |

OTHER PUBLICATIONS

Sullivan, Dan et al., "Text Mining Improves Business Intelligence and Predictive Modeling in Insurance", Information Management Magazine, Jul. 2003, 5 pgs.
SAS, "7 Ways to Fight Back Against Fraud", sascom magazine, 2007 Q4, 3 pgs.
Inna Kolyshkina and Marcel van Rooyen, "Text Mining for Insurance Claim Cost Predictiction", Springer Berlin / Heidelberg, vol. 3755/2006, Jan. 22, 2006, 11 pgs.
Charles Nyce PhD CPCU API, "Predictive Analytics", White Paper, American Institute for CPCU, Insurance Institute of America, Copyright 2007, 24 pgs.
Robert Regis Hyle, "Running Up the Flag", Feb. 2007, 4 pgs.
PCT International Search Report of the Internation Searching Authority, dated May 20, 2009, for PCT US09 39751, 2pgs.

* cited by examiner

PREDICTIVE MODEL-BASED DISCRIMINATOR

CROSS REFERENCE TO RELATED APPLICATIONS

This application is a continuation application of co-pending U.S. patent application Ser. No. 12/099,388, filed Apr. 8, 2008, the entire contents of which are herein incorporated by reference for all purposes.

FIELD OF INVENTION

The present invention relates to computer systems and more particularly to computer systems that apply predictive models.

BACKGROUND

U.S. Published Patent Application No. 2005/0276401, which names Madill, Jr., et al. as inventors, discloses a computer system that is pertinent prior art to the present invention. Among other functions, Madill's computer system may run software that appraises the likelihood that an insurance claim is fraudulent. One aspect of Madill's software encompasses a predictive model that compares a current claim with a fraud model generated from historical data that reflects past claims that were found to be fraudulent. In the one specific type of fraud model described in Madill's application, fraud patterns are detected among claimants, witnesses, medical providers, attorneys, repair facilities, etc.

The present inventors have recognized that the utility of a predictive model, for determining that certain insurance claims should be identified as potentially questionable, and referred for special investigation, can be significantly enhanced by expanding the types of information used to train the predictive model and included in current claim transaction data to which the predictive model is applied.

SUMMARY

A computer system is disclosed which includes a module which captures indeterminate data. The computer system also includes a data storage module in communication with the indeterminate data capture module. Functions performed by the data storage module include receiving, storing and providing access to indeterminate data captured by the indeterminate data capture module. In addition, the data storage module also stores and provides access to determinate data. The determinate and indeterminate data stored by the data storage module is related to historical claim transactions and to current claim transactions.

As used herein and in the appended claims, "determinate data" refers to verifiable facts such as the date of birth, age or name of a claimant or name of another individual or of a business or other entity; a type of injury; a medical diagnosis; a date of loss, or date of report of claim, or policy date or other date; a time of day; a day of the week; a vehicle identification number, a geographic location; and a policy number.

As used herein and in the appended claims, "indeterminate data" refers to data or other information that is not in a predetermined format and/or location in a data record or data form, but excludes verifiable facts embedded in narrative text or the like. Examples of indeterminate data include narrative speech or text, information in descriptive notes fields and signal characteristics in audible voice data files.

The computer system further includes a predictive model component that is coupled to the data storage module and determines whether to identify a given one of the current claim transactions for referral to an investigation unit.

The computer system also includes a computer processor that executes programmed instructions and stores and retrieves the data related to current claim transactions.

Further included in the computer system is a program memory, coupled to the computer processor, and which stores program instruction steps for execution by the computer processor.

A model training component is also included in the computer system. The model training component is coupled to the computer processor and trains the predictive model component based on the data related to the historical claim transactions in accordance with program instructions stored in the program memory and executed by the computer processor. As a consequence, a trained predictive model component is provided.

Still further included in the computer system is an output device. The output device is coupled to the computer processor and outputs an output indicative of whether the current claim transaction in question should be referred to an investigation unit. The computer processor generates the output in accordance with program instructions in the program memory and executed by the computer processor. The output is generated in response to application of data for the current claim transaction in question to the trained predictive model component.

The computer system further includes a routing module which directs workflow based on the output from the output device.

The present inventors have observed that effective indicators in an insurance claim file that a claim may be questionable may be present in indeterminate data such as claim handler's notes, interview notes, and the like. By incorporating this data, or information extracted therefrom, in historical data used to train a predictive model, and in current transaction information applied to the predictive model, the performance of the predictive model may be enhanced, and the ability of the model to recommend investigation may be improved. As a result, questionable claims may be better identified for evaluation, with an increase in an insurance company's overall ability to identify issues for further investigation.

With these and other advantages and features of the invention that will become hereinafter apparent, the invention may be more clearly understood by reference to the following detailed description of the invention, the appended claims, and the drawings attached hereto.

DETAILED DESCRIPTION

In general, and for the purposes of introducing concepts of embodiments of the present invention, a computer system incorporates a predictive model. The predictive model is trained with historical claim transaction data, and is applied to current claim transactions to determine whether the current claim transactions should be referred to an investigation unit. Both the historical claim transaction data and data representing the current claim transactions include indeterminate data or information extracted therefrom. For example, such data/information may come from narrative text or recorded voice files.

Figure 1:
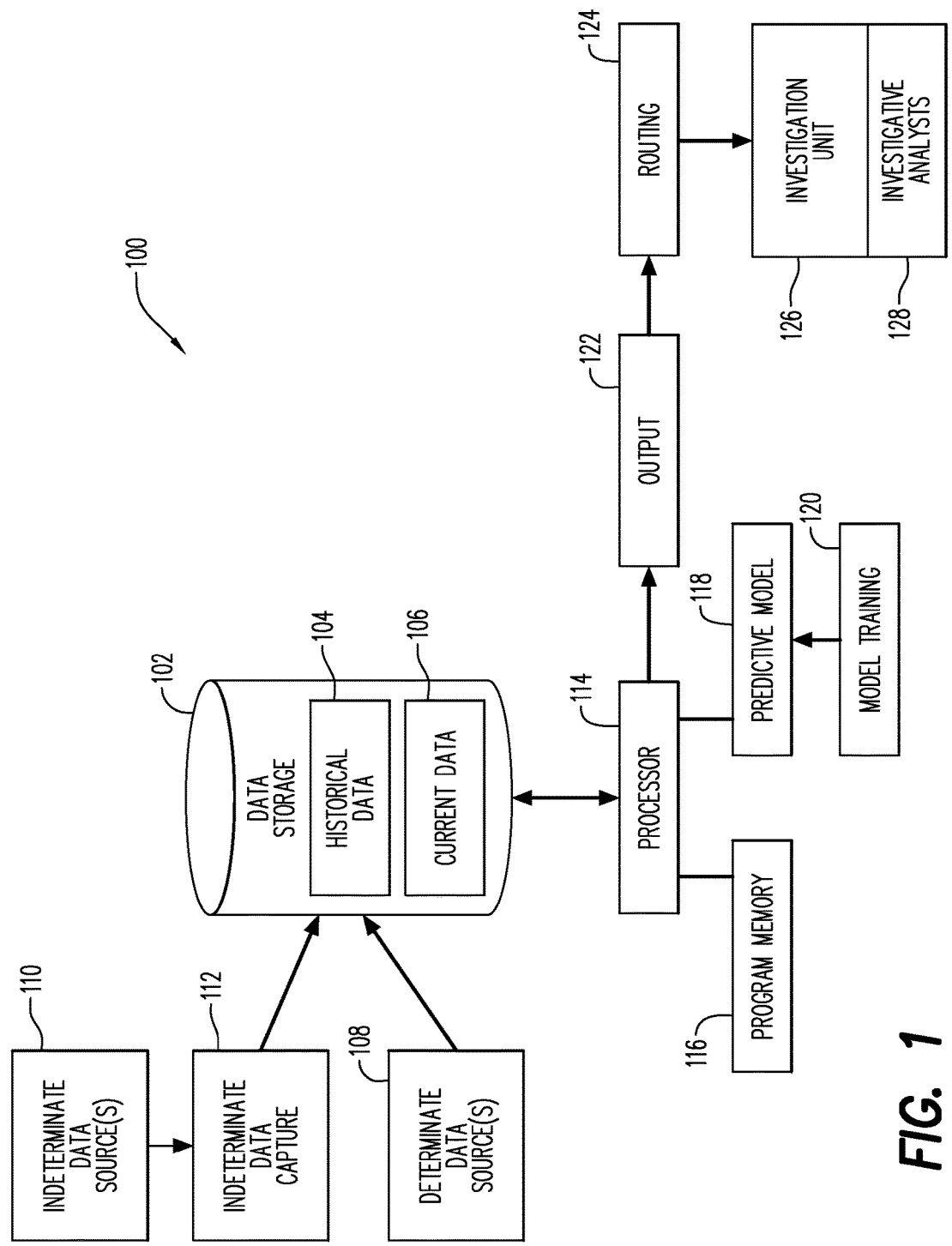
FIG. 1 is a partially functional block diagram that illustrates aspects of a computer system provided in accordance with some embodiments of the invention.

Features of some embodiments of the present invention will now be described by first referring to FIG. 1. FIG. 1 is a partially functional block diagram that illustrates aspects of a computer system 100 provided in accordance with some embodiments of the invention. For present purposes it will be assumed that the computer system 100 is operated by an insurance company (not separately shown) for the purpose of referring questionable claims to an investigation unit. The claims may be from one or more different lines of insurance, such as worker's compensation, property and casualty, etc.

The computer system 100 includes a data storage module 102. In terms of its hardware the data storage module 102 may be conventional, and may be composed, for example, by one or more magnetic hard disk drives. A function performed by the data storage module 102 in the computer system 100 is to receive, store and provide access to both historical claim transaction data (reference numeral 104) and current claim transaction data (reference numeral 106). As described in more detail below, the historical claim transaction data 104 is employed to train a predictive model to provide an output that indicates whether a claim should be referred to an investigation unit, and the current claim transaction data 106 is thereafter analyzed by the predictive model. Moreover, as time goes by, and results become known from investigations of current claim transactions, at least some of the current claim transactions may be used to perform further training of the predictive model. Consequently, the predictive model may thereby adapt itself to changing patterns of questionable claims.

Both the historical claim transaction data 104 and the current claim transaction data 106 include determinate and indeterminate data. The determinate data may come from one or more determinate data sources 108 that are included in the computer system 100 and are coupled to the data storage module 102. The determinate data may include "hard" data like the claimant's name, date of birth, social security number, policy number, address; the date of loss; the date the claim was reported, etc. One possible source of the determinate data may be the insurance company's policy database (not separately indicated). Another possible source of determinate data may be from data entry by the insurance company's claims intake administrative personnel.

The indeterminate data may originate from one or more indeterminate data sources 110, and may be extracted from raw files or the like by one or more indeterminate data capture modules 112. Both the indeterminate data source(s) 110 and the indeterminate data capture module(s) 112 may be included in the computer system 100 and coupled directly or indirectly to the data storage module 102. Examples of the indeterminate data source(s) 110 may include data storage facilities for document images, for text files (e.g., claim handlers' notes) and digitized recorded voice files (e.g., claimants' oral statements, witness interviews, claim handlers' oral notes, etc.). Examples of the indeterminate data capture module(s) 112 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual from, e.g., a recording of the individual's voice or the individual's body language.

The present inventors believe that applying a predictive model to both "hard" and "soft" claim information may result in more effective performance by the predictive model than consideration of "hard" information alone. For example, claim handlers' opinions may be extracted from their narrative text file notes. Certain types of claim handlers' information, taken with certain types of hard facts, may be particularly likely to provide a reliable indication that a claim should be referred to an investigation unit. In this way, machine intelligence represented by a predictive model may be melded with the claim handlers' human judgment to produce efficient recognition of questionable claim transactions. This may result in referrals of claim transactions for investigations in cases where the claim handlers' human judgment alone would not result in a referral. The predictive model may determine, for example, that when certain expressions of claim handlers' conclusions coexist with certain "hard" data in a claim transaction file, the claim is particularly likely to be questionable.

The computer system 100 also may include a computer processor 114. The computer processor 114 may include one or more conventional microprocessors and may operate to execute programmed instructions to provide functionality as described herein. Among other functions, the computer processor 114 may store and retrieve historical claim transaction data 104 and current claim transaction data 106 in and from the data storage module 102. Thus the computer processor 114 may be coupled to the data storage module 102.

The computer system 100 may further include a program memory 116 that is coupled to the computer processor 114. The program memory 116 may include one or more fixed storage devices, such as one or more hard disk drives, and one or more volatile storage devices, such as RAM (random access memory). The program memory 116 may be at least partially integrated with the data storage module 102. The program memory 116 may store one or more application programs, an operating system, device drivers, etc., all of which may contain program instruction steps for execution by the computer processor 114.

The computer system 100 further includes a predictive model component 118. In certain practical embodiments of the computer system 100, the predictive model component 118 may effectively be implemented via the computer processor 114, one or more application programs stored in the program memory 116, and data stored as a result of training operations based on the historical claim transaction data 104 (and possibly also data resulting from training with current claims that have been investigated and found to be proper or improper). In some embodiments, data arising from model training may be stored in the data storage module 102, or in a separate data store (not separately shown). A function of the predictive model component 118 may be to identify current claim transactions that should be referred to an investigation unit. The predictive model component may be directly or indirectly coupled to the data storage module 102.

The predictive model component 118 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 100 includes a model training component 120. The model training component 120 may be coupled to the computer processor 114 (directly or indirectly) and may have the function of training the predictive model component 118 based on the historical claim transaction data 104. (As will be understood from previous discussion, the model training component 120 may further train the predictive model component 118 as further relevant claim transaction data becomes available.) The model training component 120 may be embodied at least in part by the computer processor 114 and one or more application programs stored in the program memory 116. Thus the training of the predictive model component 118 by the model training component 120 may occur in accordance with program instructions stored in the program memory 116 and executed by the computer processor 114.

In addition, the computer system 100 may include an output device 122. The output device 122 may be coupled to the computer processor 114. A function of the output device 122 may be to provide an output that is indicative of whether (as determined by the trained predictive model component 118) a particular one of the current claim transactions should be referred to an investigation unit. The output may be generated by the computer processor 114 in accordance with program instructions stored in the program memory 116 and executed by the computer processor 114. More specifically, the output may be generated by the computer processor 114 in response to applying the data for the current claim transaction to the trained predictive model component 118. The output may, for example, be a number within a predetermined range of numbers. In some embodiments, the output device may be implemented by a suitable program or program module executed by the computer processor 114 in response to operation of the predictive model component 118.

Still further, the computer system 100 may include a routing module 124. The routing module 124 may be implemented in some embodiments by a software module executed by the computer processor 114. The routing module 124 may have the function of directing workflow based on the output from the output device. Thus the routing module 124 may be coupled, at least functionally, to the output device 122. In some embodiments, for example, the routing module may direct workflow by referring, to an investigation unit 126, current claim transactions analyzed by the predictive model component 118 and found to be questionable. In particular, the questionable current claim transactions may be referred to investigative analysts 128 who are employed in the investigation unit 126. The investigation unit 126 may be a part of the insurance company that operates the computer system 100, and the investigative analysts may be employees of the insurance company.

Figure 2:
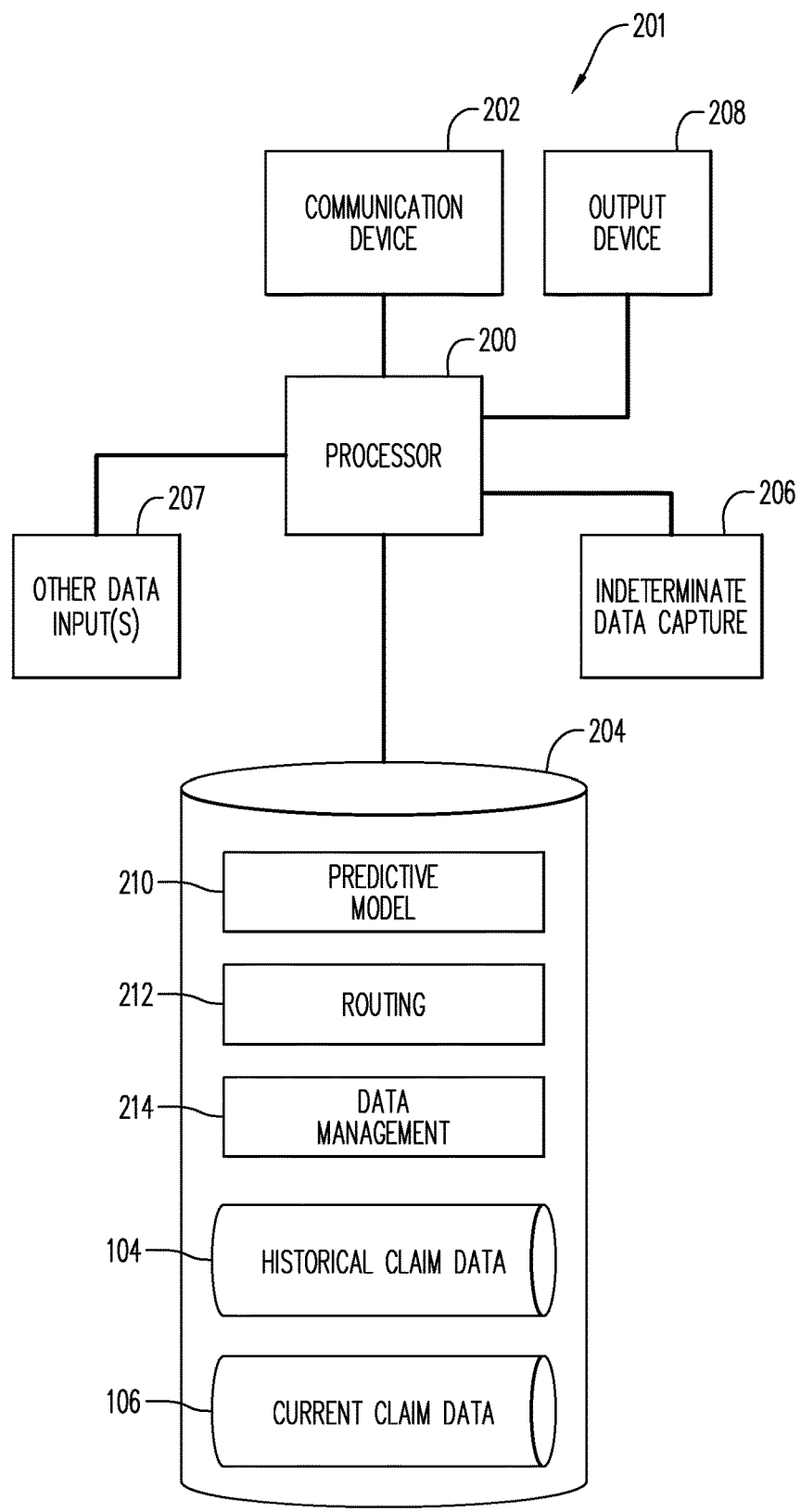
FIG. 2 is a block diagram that illustrates a computer that may form all or part of the system of FIG. 1.

FIG. 2 is a block diagram that illustrates a computer 201 that may form all or part of the system 100 of FIG. 1.

As depicted, the computer 201 includes a computer processor 200 operatively coupled to a communication device 202, a storage device 204, an indeterminate data capture device 206, one or more other input devices 207 and an output device 208. Communication device 202 may be used to facilitate communication with, for example, other devices (such as personal computers—not shown in FIG. 2—assigned to individual employees of the insurance company). The indeterminate data capture device 206 may include any one or more of the devices referred to above in connection with block 112 in FIG. 1 and may have the functions ascribed above to those devices. The other input device(s) 207 may comprise, for example, a keyboard, a keypad, a mouse or other pointing device, a microphone, knob or a switch, an infra-red (IR) port, a docking station, and/or a touch screen. The other input device(s) 207 may be used, for example, to enter information. Output device 208 may comprise, for example, a display (e.g., a display screen) a speaker, and/or a printer.

Storage device 204 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

In some embodiments, the hardware aspects of the computer 201 may be entirely conventional.

Storage device 204 stores one or more programs or portions of programs (at least some of which being indicated by blocks 210-214) for controlling processor 200. Processor 200 performs instructions of the programs, and thereby operates in accordance with the present invention. In some embodiments, the programs may include a program or program module 210 that acts as a predictive model for determining whether to refer current claim transactions to an investigation unit. The training function for the predictive model 210 is not indicated separately in FIG. 2 from the predictive model itself.

Another program or program module stored on the storage device 204 is indicated at block 212 and is operative to allow the computer 201 to route or refer current claim transactions to insurance company employees as appropriate based on the results obtained by applying the predictive model 210 to the data which represents the current claim transactions.

Still another program or program module stored on the storage device 204 is indicated at block 214 and engages in database management and like functions related to data stored on the storage device 204. There may also be stored in the storage device 204 other software, such as one or more conventional operating systems, device drivers, communications software, etc. The historical claim transaction data 104 and the current claim transaction data 106, as previously described with reference to FIG. 1, are also shown in FIG. 2 as being stored on the storage device 204.

Figure 3:
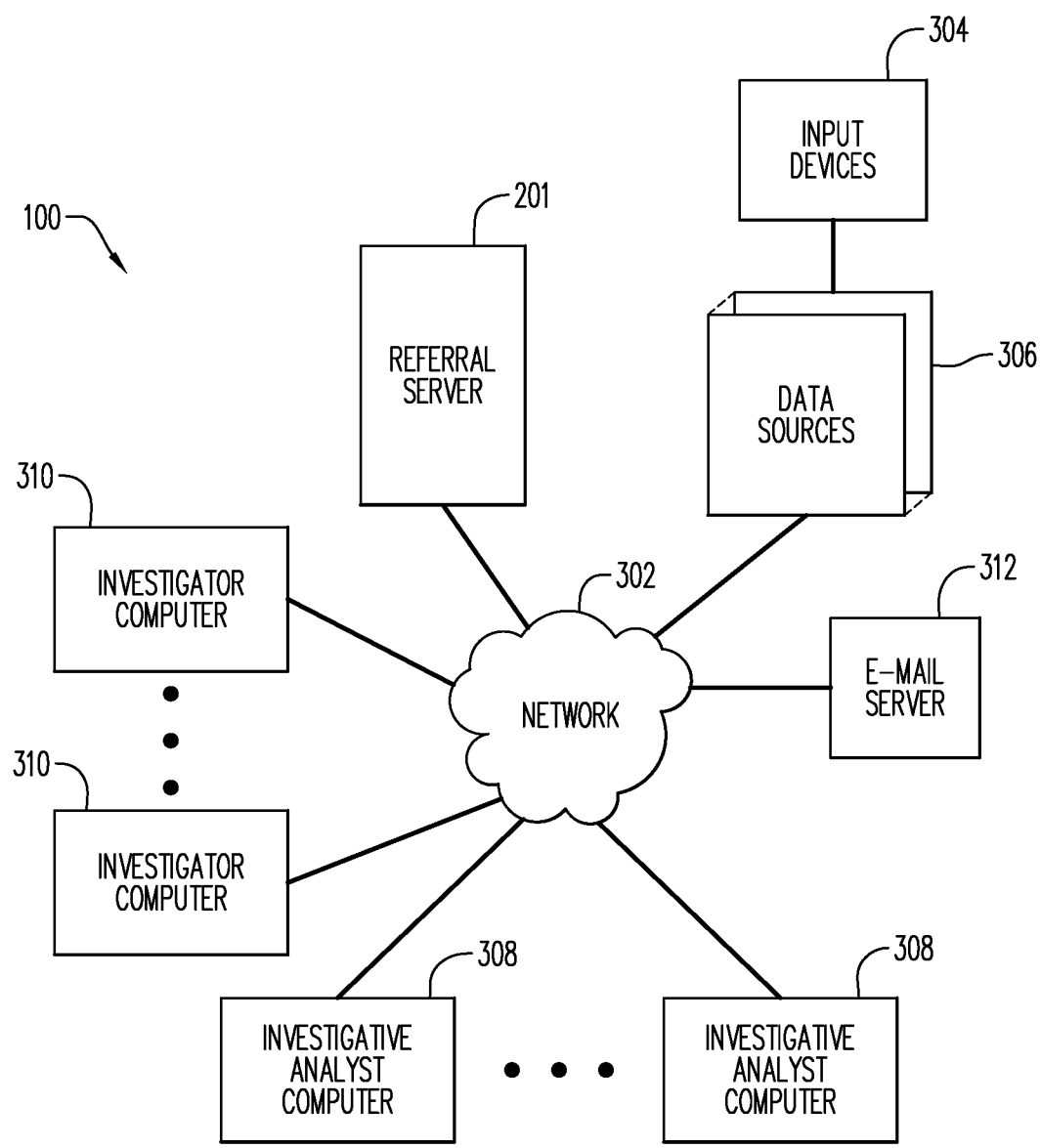
FIG. 3 is a block diagram that provides another representation of aspects of the system of FIG. 1.

FIG. 3 is another block diagram that presents the computer system 100 in a somewhat more expansive or comprehensive fashion (and/or in a more hardware-oriented fashion).

The computer system 100, as depicted in FIG. 3, includes the computer 201 of FIG. 2. The computer 201 is depicted as a "referral server" in FIG. 3, given that a function of the computer 201 is to selectively refer current claim transactions to an investigation unit of the insurance company. As seen from FIG. 3, the computer system 100 may further include a conventional data communication network 302 to which the computer/referral server 201 is coupled.

FIG. 3 also shows, as parts of computer system 100, data input device(s) 304 and data source(s) 306, the latter (and possibly also the former) being coupled to the data communication network 302. The data input device(s) 304 and the data source(s) 306 may collectively include the devices 108, 110 and 112 discussed above with reference to FIG. 1. More generally, the data input device(s) 304 and the data source(s) 306 may encompass any and all devices conventionally used, or hereafter proposed for use, in gathering, inputting, receiving and/or storing information for insurance company claim files.

Still further, FIG. 3 shows, as parts of the computer system 100, personal computers 308 assigned for use by investigative analysts (who are members of the insurance company's investigation unit) and personal computers 310 assigned for use by investigators (also members of the investigation unit). The personal computers 308, 310 are coupled to the data communication network 302.

Also included in the computer system 100, and coupled to the data communication network 302, is an electronic mail server computer 312. The electronic mail server computer 312 provides a capability for electronic mail messages to be exchanged among the other devices coupled to the data communication network 302.

Thus the electronic mail server computer 312 may be part of an electronic mail system included in the computer system 100.

The computer system 100 may also be considered to include further personal computers (not shown), including, e.g., computers which are assigned to individual claim handlers or other employees of the insurance company.

Figure 4:
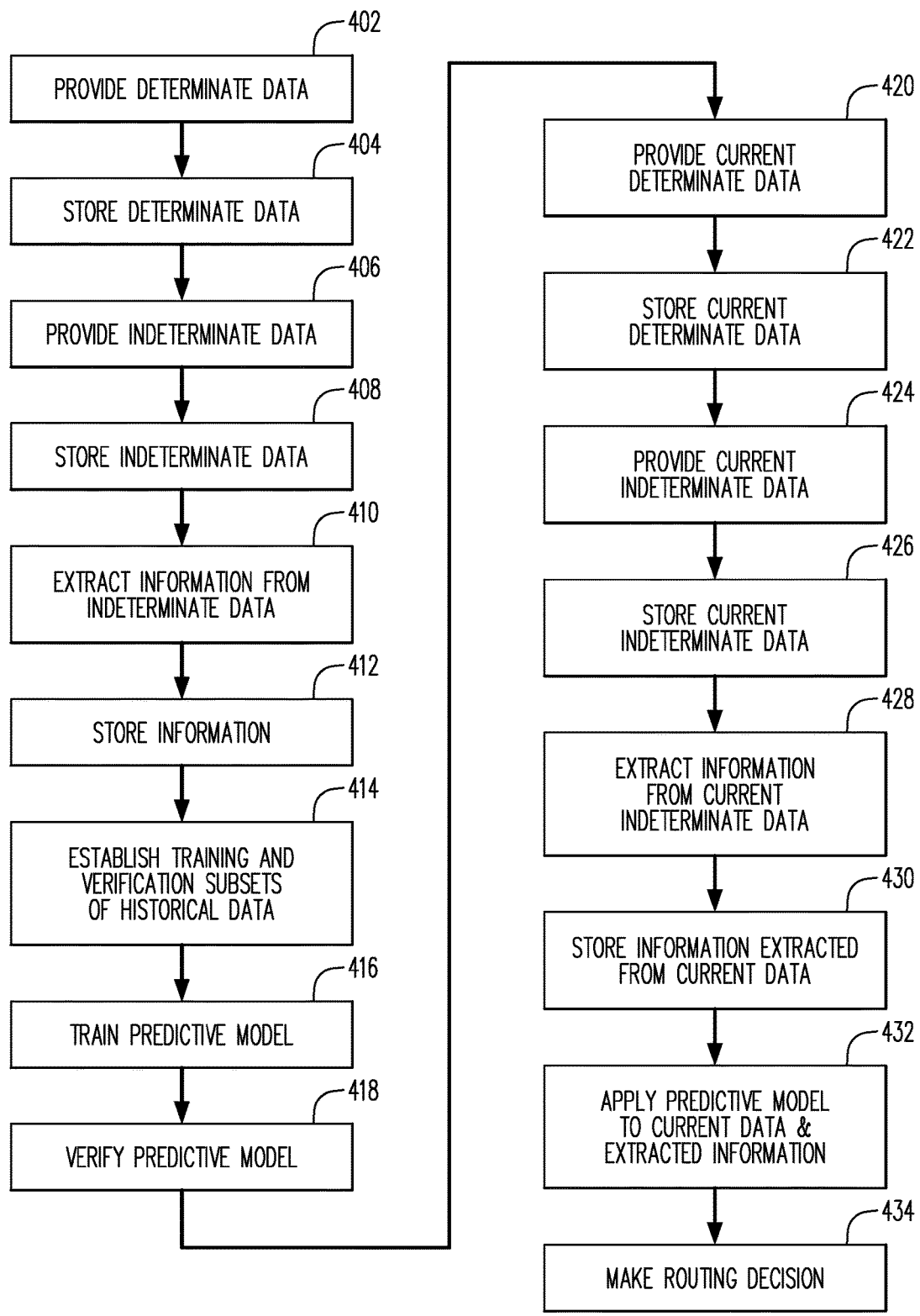
FIG. 4 is a flow chart that illustrates a process that may be performed in the computer system of FIGS. 1-3.

FIG. 4 is a flow chart that illustrates a process that may be performed in the computer system 100/computer 201 of FIGS. 1-3.

At 402 in FIG. 4, determinate data concerning historical claim transactions is provided to the computer system 100/computer 201. As indicated above, the determinate data may reflect the "hard facts" about the historical claim transactions. In addition, the determinate data may include, for each historical claim transaction, an indication as to whether or not the transaction in question was determined to be proper. It will be understood that the historical claim transactions relate to claims made during a past period of time or periods of time. This information may, for example, be loaded into the computer 201 from a database and/or archive of claim files.

At 404, the determinate historical claim transaction data may be stored in the computer system 100/computer 201.

At 406, indeterminate data for the historical claim transactions is provided to the computer system 100/computer 201. The indeterminate data may take the form, for example, of images of paper documents, digitized voice recordings, text files that reflect claim handlers' case file notes, or text files generated by OCR-processing paper documents or document images, or text files generated by speech-to-text conversion of digitized voice recordings.

At 408, the indeterminate historical claim transaction data may be stored in the computer system 100/computer 201.

At 410 the computer system 100/computer 201 performs processing to extract significant information from the stored indeterminate historical claim transaction data. The extraction of information from the indeterminate historical claim transaction data may take one or more of a number of different forms. For example, the computer system 100/computer 201 may perform key word searches on text files included in the indeterminate historical claim transaction data. As another example, the computer system 100/computer 201 may perform natural language processing on the text files included in the indeterminate historical claim transaction data, to determine whether those text files contain, in substance, one or more of a number of different types of statements. (E.g., "employer disputes claim" (for a worker's compensation claim), or "witness saw claimant engaging in physical activity", or "claimant's statements are inconsistent".) As still another example, names of entities (e.g., the treating physician's name) may be extracted from text files (e.g., claimant's attorney's demand package after OCR scanning) by entity analysis of the text files. As yet another example, a digitized recorded voice file may be analyzed to detect the speaker's (e.g., the claimant's) state of mind. This may be done, for example, by use of commercially available software packages and/or in accordance with teachings of U.S. Published Patent Application No. 2003/0033145 (which names Petrushin as inventor).

One example of natural language processing may operate to mine claim handlers' opinions from the narrative text notes.

At 412 in FIG. 4, the information extracted at 410 from the indeterminate historical claim transaction data is stored by the computer system 100/computer 201.

At 414, two mutually exclusive subsets of the historical claim transactions are formed. One of the two subsets is to be used for training the predictive model. The other of the two subsets is to be used for verifying the predictive model after it has been trained.

At 416, the predictive model is trained using the first one of the subsets of historical claim transaction data. In some embodiments, for example, the predictive model may be trained by using one or more types of regression analysis. In addition or alternatively, other types of pattern detection analysis may be applied to the first subset of historical claim transaction data. As another alternative, the predictive model may be implemented as a neural network. In some embodiments, the predictive model is of a kind that, for each claim transaction (after training) to which it is applied, the model generates a numerical output within a certain range. The output may be generated in such a manner that a higher output implies a higher likelihood that it would be worthwhile to refer the claim for special investigation.

After training of the predictive model, it is verified, as indicated at 418, by applying the model to the second subset of historical claim transaction data. The results of the verification processing are analyzed to confirm that the predictive model performs effectively in generally assigning higher outputs to the claim transactions in the second subset that actually had been determined to be improper.

At 420 in FIG. 4, determinate data concerning current claim transactions is provided to the computer system 100/computer 201. Preferably the determinate data for the current claim transactions is of the same kinds as the determinate data for the historical claim transactions, as described above in connection with step 402. The determinate data may be loaded into the computer 201 from a database of current claim information.

At 422, the determinate current claim transaction data may be stored in the computer system 100/computer 201.

At 424, indeterminate data for the current claim transactions is provided to the computer system 100/computer 201. Preferably the indeterminate data for the current claim transactions is of the same kinds as the indeterminate data for the historical claim transactions, as described above in connection with step 406.

At 426, the indeterminate current claim transaction data may be stored in the computer system 100/computer 201.

At 428, the computer system 100/computer 201 performs processing to extract significant information from the stored indeterminate current claim transaction data. Preferably this is done in the same manner as the information extraction described above in connection with step 410.

At 430, the information extracted at 428 from the indeterminate current claim transaction data is stored by the computer system 100/computer 201.

Referring now to FIG. 4, at 432 the predictive model is applied to the determinate data, and to the information extracted at 428 from the indeterminate data, for one of the current claim transactions. (One could also say that the determinate data and the information extracted from the indeterminate data are applied to the predictive model.) The operation of the predictive model results in an output being generated for the current claim transaction in question. As indicated by previous discussion, the output is indicative of a determination by the predictive model as to the likelihood that the current claim transaction should be identified as potentially questionable, with a higher output indicating a greater likelihood that the claim is questionable.

At 434 in FIG. 4, the computer 201 makes a routing decision with respect to the current claim transaction applied to the predictive model at 432. This decision is based on the output generated from the predictive model for the current claim transaction in question. From ensuing discussion, it will be understood that the routing decision may be whether to refer the current claim transaction in question to the insurance company's investigation unit.

Figure 5:
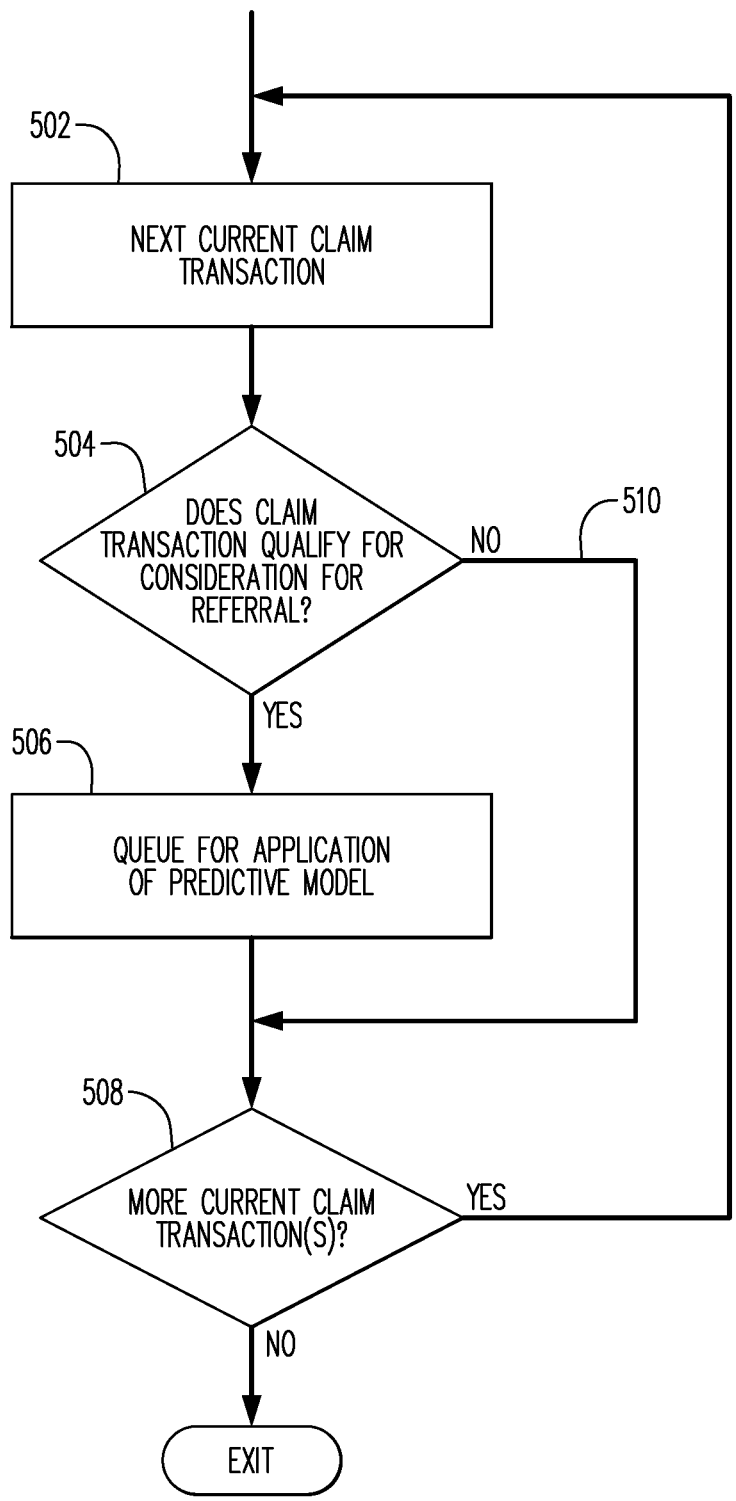
FIG. 5 is a flow chart that illustrates aspects of the process of FIG. 4.
Figure 6:
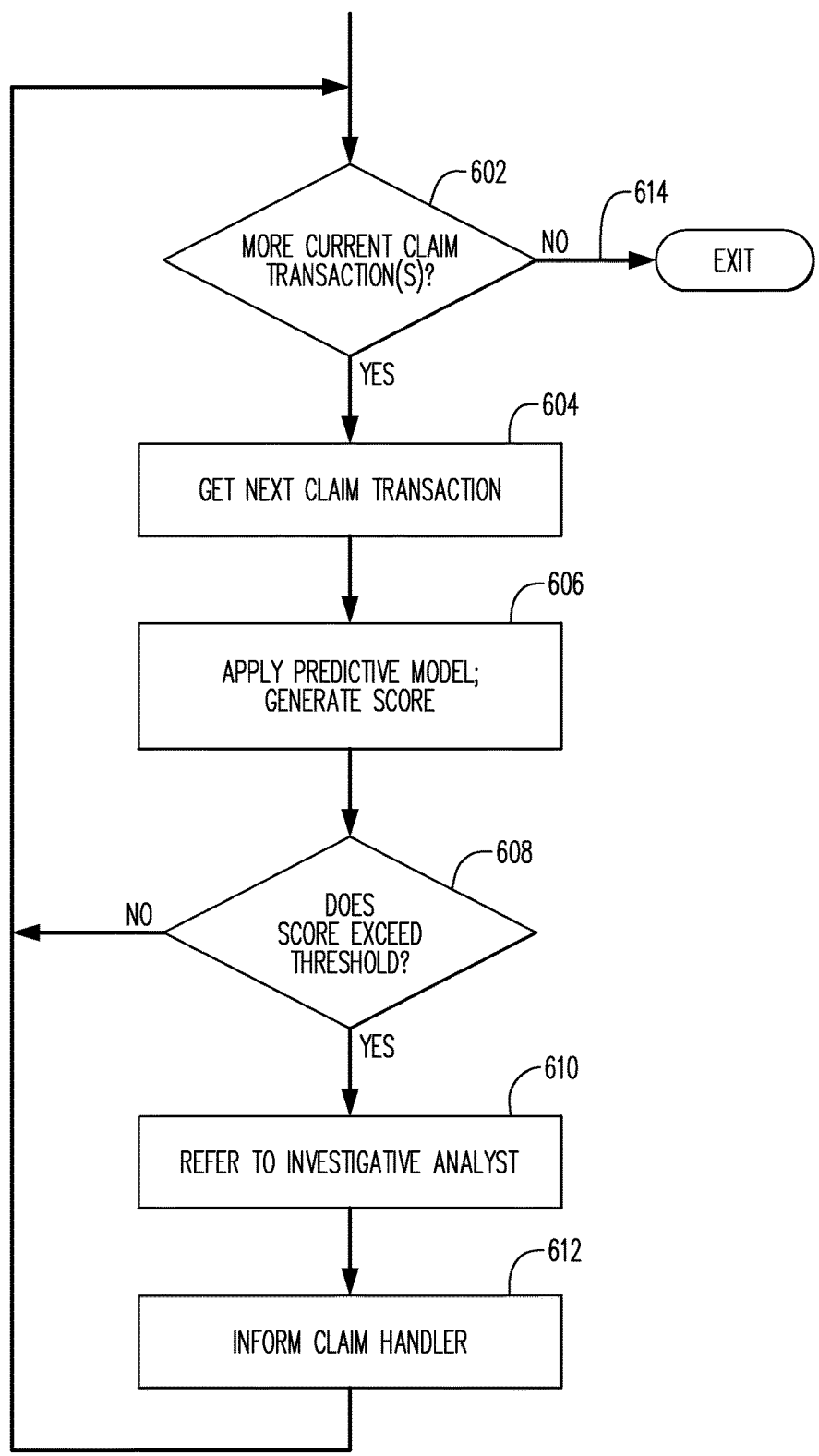
FIG. 6 is a flow chart that illustrates aspects of the process of FIG. 4.

FIGS. 5 and 6 are flow charts that illustrate additional details of the process of FIG. 4.

Referring initially to FIG. 5, at 502 data for the next (or first) current claim transaction in a batch of transactions to be screened is accessed. Then, at decision block 504 the computer system 100/computer 201 determines whether the current claim transaction accessed at 502 qualifies for consideration for referral to the investigations unit. That is, certain current claim transactions may fall into categories such that the current claim transaction is highly unlikely to be questionable, hence not worth analyzing by the predictive model. Examples of current claim transactions that are highly unlikely to be questionable may include, for example, worker's compensation claims arising from loss of life on the job, or from occupational illness. Thus decision block 504 may entail determining whether the current claim transaction accessed at 502 falls into one of the categories that are highly unlikely to be questionable. It may be said that decision block 504 performs a "pre-screening" relative to the current claim transaction accessed at block 502.

If a determination is made at decision block 504 to the effect that it makes sense to apply the current claim transaction accessed at 502 to the predictive model, then block 506 may follow decision block 504. At block 506, the current claim transaction accessed at 502 is placed in a queue for application of the predictive model. Then decision block 508 follows block 506. At decision block 508, it is determined whether any more current claim transactions are awaiting analysis by the predictive model. If so, then the process of FIG. 5 loops back to block 502, and the next current claim transaction awaiting screening is accessed and subjected to "pre-screening" at decision block 504. However, if at decision block 508 it is determined that no further current claim transactions are awaiting analysis by the predictive model, then the process of FIG. 5 ends.

Considering again decision block 504, if a determination is made at that point that the current claim transaction accessed at block 502 is of a kind such that it does not make sense to apply the predictive model, then, per branch 510, the process of FIG. 5 skips from decision block 504 to decision block 508, omitting block 506 with respect to the current claim transaction accessed at block 502. Thus, in such cases, the current claim transaction accessed at block 502 is not queued for application of the predictive model and is not screened for possible referral to the investigation unit.

Referring now to FIG. 6, the process illustrated therein begins with decision block 602. At decision block 602 the computer system 100/computer 201 determines whether there are any current claim transactions in the queue referred to in connection with block 506 of FIG. 5. If there is at least one current claim transaction in the queue, then block 604 follows decision block 602. At 604, the computer system 100/computer 201 accesses the next current claim transaction in the queue. Then, at 606, the computer system 100/computer 201 applies the predictive model to the current claim transaction accessed at 604. From previous discussion it will be recognized that the application of the predictive model to the current claim transaction in question results in the computer system 100/computer 201 generating an output for the current claim transaction in question, where the output is indicative of whether it is advisable that the current claim transaction in question should be referred to the investigation unit.

Decision block 608 follows block 606. At decision block 608, the computer system 100/computer 201 determines whether the output generated at 606 exceeds a predetermined threshold. The threshold may, for example, have been set at the time that the training of the predictive model was verified (block 418, FIG. 4). The threshold may have been set in such a manner as to balance the potentially conflicting goals of avoiding false positive indications, while avoiding false negative determinations. The achievement of this balance may reflect the respective levels of outputs generated by the predictive model during verification processing to proper and improper historical claim transactions.

If it is determined at decision block 608 that the output generated at 606 exceeds the threshold, then block 610 follows decision block 608. At block 610, the computer system 100/computer 201 may refer the current claim transaction in question to an investigative analyst in the insurance company's investigation unit. This may be done by the computer system 100/computer 201 automatically e-mailing the electronic case file for the claim transaction to the investigative analyst. If more than one investigative analyst is available to receive the referral of the claim transaction, then the computer system 100/computer 201 may automatically select the investigative analyst who is to receive the referral based on one or more factors such as the type of claim, the investigative analyst's qualifications and/or experience, the investigative analyst's current workload, etc. The investigative analyst's role, at this point, is to review the claim transaction, confirm that the referral is warranted, proceed with a desk analysis/investigation of the claim transaction, and, if field investigation is then found to be warranted, refer the claim transaction on to a field investigator for further investigation.

In some embodiments, the computer system 100/computer 201 may cause the claim transactions referred to each investigative analyst, and/or to the investigation unit as a whole, to be queued according to the outputs generated for the claim transactions. That is, claim transactions having higher outputs assigned by the predictive model may be placed higher in the individual investigative analysts' queues and/or in the investigation unit's queue.

Block 612 may follow block 610. At block 612 the computer system 100/computer 201 automatically notifies the claim handler to whom the claim transaction had been assigned that the claim transaction was being referred to the investigation unit and that the claim handler should suspend processing of the claim transaction. At the same time, the computer system 100/computer 201 may inform other interested branches of the insurance company that the claim transaction is being referred to the investigation unit.

After block 612, the process of FIG. 6 loops back to decision block 602 to determine whether there are other claim transactions in the queue to be analyzed by the predictive model. If, at a point when decision block 602 is reached, there are no more claim transactions in the queue, then the process of FIG. 6 ends, as indicated at branch 614.

As noted above, in some embodiments, when the predictive model indicates that a current claim transaction should be referred to the investigation unit, the current claim transaction may be referred to an investigative analyst. In other embodiments, however, the current claim transaction may be referred directly to a field investigator. Nevertheless, it may be preferable to make claim transaction referrals for investigation by an investigative analyst. The investigative analyst may take steps such as confirming that the referral for investigation is appropriate, planning and executing a "desk investigation" of the claim transaction, and making a further referral to a field investigator if warranted. If the referral for investigation was not appropriate, the investigative analyst may return the claim transaction to the claim handler without investigating the claim transaction (possibly with an explanation why the investigative analyst considered that the claim transaction should not be investigated by the investigation unit). If the referral was appropriate, the investigative analyst may proceed with a desk investigation, and may report the results of his/her investigation to the claim handler.

Referrals for investigation by an investigative analyst may prove more economical than referrals directly to a field investigator. Typically investigation by an investigative analyst may be less costly than investigation by a field investigator. Also, an investigative analyst may be more skilled and experienced at desk investigation techniques than a field investigator. Involvement by an investigative analyst may help to conserve, and use more efficiently, potentially expensive and/or scarce field investigator resources.

The investigation unit may perform various types of investigations, including investigations related to subrogation or possible fraud.

In some embodiments, the investigation unit may receive referrals via other channels than referral based on a predictive model. For example, referrals may also be from claim handlers, or from outside sources, such as the National Insurance Crime Bureau (NICB), directly from insurance agents, etc. Other referrals for investigation may take place selectively/pro-actively based on other sources when suspicious claim transactions or patterns of questionable claim transactions are identified.

In some embodiments, some or all of the above-mentioned communications among investigative analysts, claim handlers, and field investigators may be via the electronic mail system referred to above in conjunction with FIG. 3.

The process descriptions and flow charts contained herein should not be considered to imply a fixed order for performing process steps. Rather, process steps may be performed in any order that is practicable.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system comprising:
an indeterminate data capture component, including a natural language processing application, configured to:
receive raw indeterminate data corresponding to historical claim transactions and current claim transactions; and
extract indeterminate data from the raw indeterminate data, comprising text data, indicative of the historical claim transactions and the current claim transactions, and to mine opinion data from the text data;
a predictive model component, configured to:
train the predictive model component, based on determinate data and the extracted indeterminate data corresponding to the historical claim transactions, to generate a value indicative of whether a claim is questionable; and
adapt the predictive model component to changing patterns of questionable claim transactions by periodically updating the predictive model component based on new determinate data and new extracted indeterminate data;
a screening module configured to compare each of the current claim transactions to the data indicative of claim categories that are highly unlikely to be questionable;
a computer processor configured to:
categorize, based on application of the screening module, each of said current claim transactions as one of (1) a current claim suitable for analysis by a computerized predictive model when the current claim transaction does not correspond to a plurality of claim categories that are highly unlikely to be questionable, and (2) a current claim not suitable for analysis by the computerized predictive model when the current claim transaction corresponds to at least one of the claim categories that are highly unlikely to be questionable;
responsive to a categorization of one or more current claim transactions as not suitable for analysis by the computerized predictive model, transmit an electronic claim file to a claims processing computer; and
responsive to a categorization of one or more current claim transactions as suitable for analysis by the computerized predictive model:
determine, by application of the predictive model component to each of the one or more current claim transactions categorized as suitable for analysis by the computerized predictive model, a value indicative of whether the current claim transaction is questionable;
output, by an output device coupled to the computer processor, for each of the current claim transactions categorized as suitable for analysis by the computerized predictive model, the determined value indicative of whether the current claim transaction is questionable;
a routing module configured to:
responsive to a determination that the outputted value exceeds a threshold value, transmit data indicative of an electronic case file for the one of the current claim transactions to an investigation unit computer; and responsive to a determination that the outputted value does not exceed the threshold value, transmit data indicative of an electronic case file to a claims processing computer; and a data storage unit configured to receive, store, and provide access to the indeterminate data and determinate data corresponding to the historical claim transactions and to the current claim transactions, and the data indicative of claim categories that are highly unlikely to be questionable.

2. The computer system of claim 1, wherein the indeterminate data capture component includes an optical character reader for converting paper documents to text files; and wherein the natural language processing application identifies opinion data from narrative text data extracted by the optical character reader from narrative text notes.

3. The computer system of claim 1, wherein the natural language processing application is configured to determine whether the raw indeterminate data contains one or more predetermined statements.

4. The computer system of claim 1, wherein:

the raw indeterminate data includes a recording of a claimant's voice; and the indeterminate data capture component applies a speech recognition application to the recording of the claimant's voice to generate one or both of extracted indeterminate data comprising claimant voice text data and data corresponding to the claimant's state of mind.

5. The computer system of claim 1, wherein the extracted indeterminate data includes at least one of: (a) text data captured by optical character reading; (b) information extracted from text data; and (c) text data converted from a voice signal.

6. The computer system of claim 1, wherein the routing module being configured to transmit the data indicative of the electronic case file for the one of the current claim transactions to the investigation unit computer comprises the routing module being configured to:

transmit the data indicative of the case file for the one of the current claim transactions, and data indicative of the outputted value indicative of whether each of the current claim transactions is questionable, to an investigation unit computer queue which is configured to place data indicative of case files in order according to the outputted value corresponding to each of the case files.

7. A computer-implemented method comprising:

receiving determinate data and raw indeterminate data corresponding to historical claim transactions and current claim transactions;

extracting, by one or more computer processors, from the raw indeterminate data by an indeterminate data capture module, indeterminate data comprising text data, the indeterminate data capture module including a natural language processing application to mine opinion data from the text data;

storing, in a data storage device, the determinate data and the extracted indeterminate data;

training, by a model training component, a predictive model component for evaluating claims for referral to an investigation unit based on the determinate data and the extracted indeterminate data related to the historical claim transactions, to generate a value indicative of whether a claim is questionable;

adapting the predictive model component to changing patterns of questionable claim transactions by periodically updating the predictive model component based on new determinate data and new extracted indeterminate data;

comparing, by a screening module, each of the current claim transactions to the data indicative of claim categories that are highly unlikely to be questionable;

categorizing, based on application of the screening module, each of said current claim transactions as one of (1) a current claim suitable for analysis by a computerized predictive model when the current claim transaction does not correspond to the claim categories that are highly unlikely to be questionable, and (2) a current claim not suitable for analysis by a computerized predictive model when the current claim transaction corresponds to at least one of the claim categories that are highly unlikely to be questionable;

responsive to a categorization of one or more current claim transactions as not suitable for analysis by the computerized predictive model, transmitting an electronic claim file to a claims processing computer;

responsive to a categorization of one or more current claim transactions as suitable for analysis by the computerized predictive model:

determining, by application of the predictive model component to each of the one or more current claim transactions categorized as suitable for analysis by the computerized predictive model, a value indicative of whether the current claim transaction is questionable;

outputting, by an output device coupled to the one or more computer processors, for each of the current claim transactions categorized as suitable for analysis by the computerized predictive model, the determined value indicative of whether the current claim transaction is questionable; and directing, by a routing module, workflow including:

determining whether the outputted value for each of said current claim transactions categorized as suitable for predictive analysis exceeds a threshold value indicative of a claim being advisable for referral to an investigation unit computer;

responsive to a determination that the outputted value exceeds the threshold value, transmitting data indicative of an electronic case file for the one of the current claim transactions to an investigation unit computer; and responsive to a determination that the outputted value does not exceed the threshold value, transmitting data indicative of an electronic case file to a claims processing computer.

8. The method of claim 7, wherein extracting the extracted indeterminate data from the raw indeterminate data includes:

applying optical character recognition to paper documents to generate text files; and identifying, by the natural language processing application, opinion data from narrative text data extracted by application of optical character recognition to narrative text notes.

9. The method of claim 7, wherein:

the raw indeterminate data includes a recording of a claimant's voice; and wherein extracting the extracted indeterminate data from the raw indeterminate data includes applying a speech recognition application to the recording of the claimant's voice to generate claimant voice text data.

10. The method of claim 7, wherein a workers' compensation claim that arises from loss of life comprises a claim category that is highly unlikely to be questionable.

11. The method of claim 7, wherein the historical claim transactions and the current claim transactions comprise one of worker's compensation claims, bodily injury claims; and property damage claims.

12. The method of claim 7, wherein extracting the extracted indeterminate data includes detecting if the extracted indeterminate data includes one or more of:
   (a) an indication that one of said current claim transactions is disputed;
   (b) an indication that a claimant engaged in physical activity; and
   (c) an indication that said claimant made inconsistent statements.

* * * * *